United States Patent [19]

Furutsu et al.

[11] Patent Number: 4,954,741
[45] Date of Patent: Sep. 4, 1990

[54] CONTROL CIRCUIT FOR A VIBRATION WAVE MOTOR

[75] Inventors: Etsuro Furutsu, Kawasaki; Kazuhiro Izukawa, Yokohama, both of Japan

[73] Assignee: Canon Kabushiki Kaisha, Tokyo, Japan

[21] Appl. No.: 420,619

[22] Filed: Oct. 10, 1989

Related U.S. Application Data

[63] Continuation of Ser. No. 346,281, May 1, 1989, abandoned, which is a continuation of Ser. No. 143,753, Jan. 14, 1988, abandoned.

[30] Foreign Application Priority Data

Jan. 19, 1987 [JP] Japan ............................ 62-9442

[51] Int. Cl.$^5$ ............................................ H01L 41/08
[52] U.S. Cl. .................................. 310/316; 310/317
[58] Field of Search ............... 310/316, 317, 323, 328; 318/116, 118

[56] References Cited

U.S. PATENT DOCUMENTS

| | | | |
|---|---|---|---|
| 4,562,373 | 12/1985 | Tokusima et al. ............... | 310/323 X |
| 4,658,172 | 4/1987 | Izukawa ............................ | 310/316 |
| 4,692,649 | 9/1987 | Isukawa et al. .................... | 310/316 |
| 4,692,672 | 9/1987 | Okuno ............................... | 310/323 X |
| 4,713,571 | 12/1987 | Suzuki et al. ..................... | 310/316 |
| 4,727,276 | 2/1988 | Izukawa et al. .................. | 310/328 X |
| 4,743,789 | 5/1988 | Puskas ............................... | 310/316 |
| 4,749,896 | 6/1988 | Suzuki et al. ..................... | 310/316 |
| 4,794,294 | 12/1988 | Shimizu et al. .................. | 310/316 |
| 4,833,358 | 5/1989 | Suzuki et al. ..................... | 310/316 |

*Primary Examiner*—Mark O. Budd
*Attorney, Agent, or Firm*—Fitzpatrick Cella Harper Scinto

[57] ABSTRACT

In a speed control circuit for a vibration wave motor, when a level of a periodic signal applied to the motor is of first level, a frequency of the periodic signal is changed between a first frequency and a second frequency to change a speed between a first velocity and a second velocity, and when the frequency reaches the second frequency, the signal level is switched from the first level to the second level and the frequency is shifted by a predetermined amount toward the first frequency and then toward the second frequency so that the speed is changed from the second velocity to a third velocity.

28 Claims, 5 Drawing Sheets

CONTROL CIRCUIT FOR A VIBRATION WAVE MOTOR

This application is a continuation of application Ser. No. 7,346,281 filed May 1, 1989, now abandoned, which was a continuation of application Ser. No. 07/143,753 filed Jan. 14, 1988, now abandoned.

BACKGROUND OF THE INVENTION

1. Field of the Invention

The present invention relates to a drive circuit for a vibration wave motor.

2. Related Background Art

In the past, in order to control a speed of a vibration wave motor, a drive frequency is changed or a drive voltage is changed.

In the former method, in order to control the speed over a wide range, the drive frequency must be changed from a high frequency far from a resonance frequency of the motor. On the other hand, the drive efficiency of a vibration wave motor is high for a predetermined range of frequencies near the resonance frequency, but when the motor is driven at a frequency far from the near-resonance frequency, the drive efficiency decreases. Thus, it is difficult to drive the motor at a high efficiency over the entire speed range.

In the latter method, a power supply which varies over a wide range is required and a power supply circuit is complex and of large size.

Thus, it may be proposed to change a combination of drive frequency and voltage to control the speed over a wide range in a frequency band which permits a high drive efficiency. However, it is not possible to continuously change the motor speed by simple combination of the frequency and the voltage.

For example, the frequency is changed from a first frequency to second frequency at a first voltage to set the motor speed to a first speed at the first frequency and to a second speed at the second frequency so that the motor speed is controlled between the first and second speeds by the combination of the first voltage and the first to second frequencies, and when the voltage is changed to a second voltage level, the motor speed is changed from the second speed to a third speed by the above frequency change at the second voltage. In this case, the following problem arises at the voltage switching point.

If the frequency is changed to the second frequency under the first voltage level to change the motor speed to the second speed and then the voltage is changed to the second voltage level to shift the motor speed toward the third speed, the voltage is set at the second level and the frequency is set at the second frequency. As a result, the motor speed is switched from the second speed to the third speed by the switching of the voltage level and a continuous change from the second speed to the third speed is not attained.

SUMMARY OF THE INVENTION

It is an object of the invention to provide a vibration wave motor control circuit which a drive frequency is changed from a first frequency toward a second frequency while a signal level applied to the motor is at a first level to vary a motor speed from a first speed to a second speed, and when the frequency reaches the second frequency, the signal level is switched from the first level to a second level, and the frequency is shifted from the second frequency by a predetermined amount toward the first frequency, and when the signal level reaches the second level, the frequency is again shifted from the shifted frequency toward the second frequency so that the motor speed is varied between the second speed and a third speed.

In accordance with one aspect of the present invention, the drive state of the motor is monitored, and when the frequency reaches a resonance or near-resonance frequency, the frequency is shifted and the signal level is switched.

It is another object of the present invention to provide a vibration wave motor in which first and second voltage levels are set for a drive voltage of the vibration wave motor, a frequency of the drive voltage is variable between first and second frequencies near a resonance frequency, the frequency at the first voltage level is changed between the first and second frequencies to vary a motor speed between a first speed and a second speed, and the frequency at the second voltage level is changed in the above range to change the motor speed from the second speed to a third speed, and when the frequency changes from the first frequency to the second frequency, the drive frequency is switched from the first voltage level to the second voltage level and the frequency is shifted from the second frequency to the first frequency. In switching the voltage, the motor speed is not rapidly changed but it may maintain the previous speed and the motor speed is continuously changed over a wide range from the first speed to the third speed.

DESCRIPTION OF THE PREFERRED EMBODIMENTS

Figure 1:
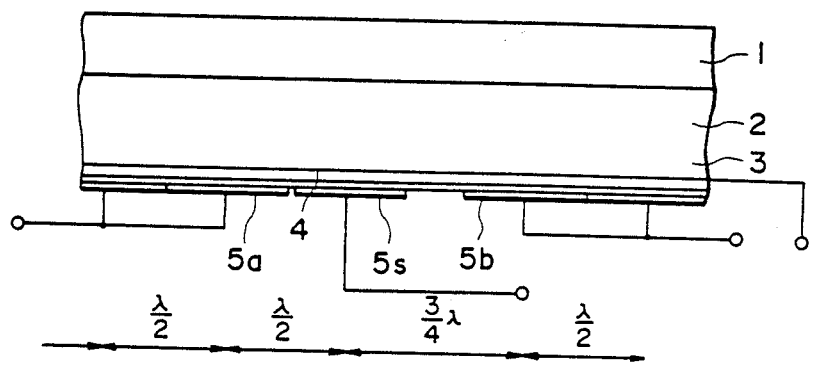
FIG. 1 shows a sectional view of a vibration wave motor used in the present invention.

FIG. 1 is a sectional view of a vibration wave motor as viewed in a circumferential direction. Numeral 1 denotes a rotor, numeral 3 denotes a vibration member, numeral 4 denotes a polarized piezoelectric element attached to the vibration member 3, and numeral 5 denotes electrodes. The vibration member 3 and the piezoelectric element 4 form a stator 2, and the rotor 1 frictionally contacts to the vibration member 3. The piezoelectric element 4 may be substituted by an electrostrictive element.

The electrodes $5a$ are arranged at an interval of $\lambda/2$ where $\lambda$ is a wavelength of a bending travelling wave in the vibration member 3. The electrodes $5b$ are drive electrodes which are also arranged at the interval of $\lambda/2$ on the piezoelectric element 4. Numeral $5s$ denotes a vibration detecting electrode. The drive electrodes $5a$ and the vibration detecting electrode 5s are positionally shifted by λ/2 (that is, in phase). The electrodes 5b and 5s are positionally shifted by 3λ/4. A portion of the piezoelectric element to which the drive voltages are applied by the electrodes 5a form a phase A piezoelectric element, and a portion of the piezoelectric element to which the drive voltages are applied by the electrodes 5b form a phase B piezoelectric element. The polarization of the piezoelectric element and the arrangement of the electrodes have been well known and detailed explanation thereof is omitted.

In the above arrangement, when periodic voltages having a phase difference of 90° therebetween are applied to the electrodes 5a and 5b, a travelling vibration wave is generated on the vibration member 3 and the rotor 1 is driven by the vibration wave. When the drive signal to the electrodes 5a is of a resonance frequency fr, a signal waveform from the electrode 5s is −90° phase-shifted from the drive signal to the electrodes 5a, and when the drive signal deviates from the resonance frequency, the phase difference between the electrodes 5a and 5s deviates from −90°. In the present invention, this phase difference is detected to detect the deviation of the drive frequency from the resonance frequency fr.

The phase difference between the signals of the electrodes 5a and 5s deviates from −90° depending on the relative position of the electrodes 5s and 5a. However, since the phase difference between the signals of the electrodes 5a and 5s is in a predetermined relationship if the resonance drive state is maintained, the deviation of the drive frequency from the resonance frequency fr can be detected by detecting the deviation of the phase difference between the signals of the electrodes 5a and 5s from the predetermined phase difference.

Figure 2:
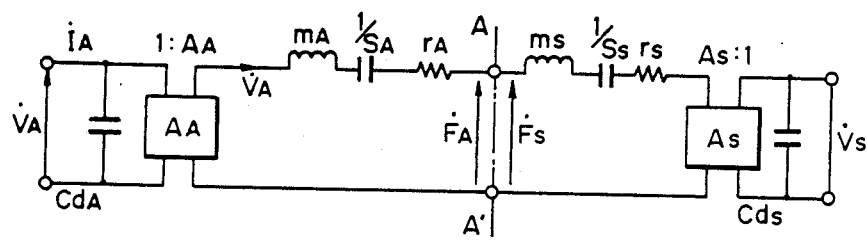
FIG. 2 shows an equivalent circuit of the motor of FIG. 1.
Figure 3:
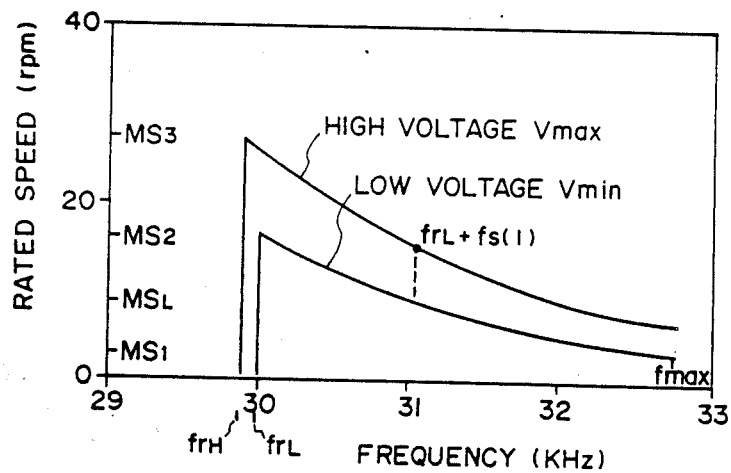
FIG. 3 illustrates a speed control characteristic by a drive circuit of a vibration wave motor of the present invention.

FIG. 2 shows an electrical equivalent circuit of the vibration wave motor of FIG. 1, and FIG. 3 shows a characteristic of a driving A.C. signal to the vibration wave motor versus a rated speed to the applied voltage.

Figure 4:
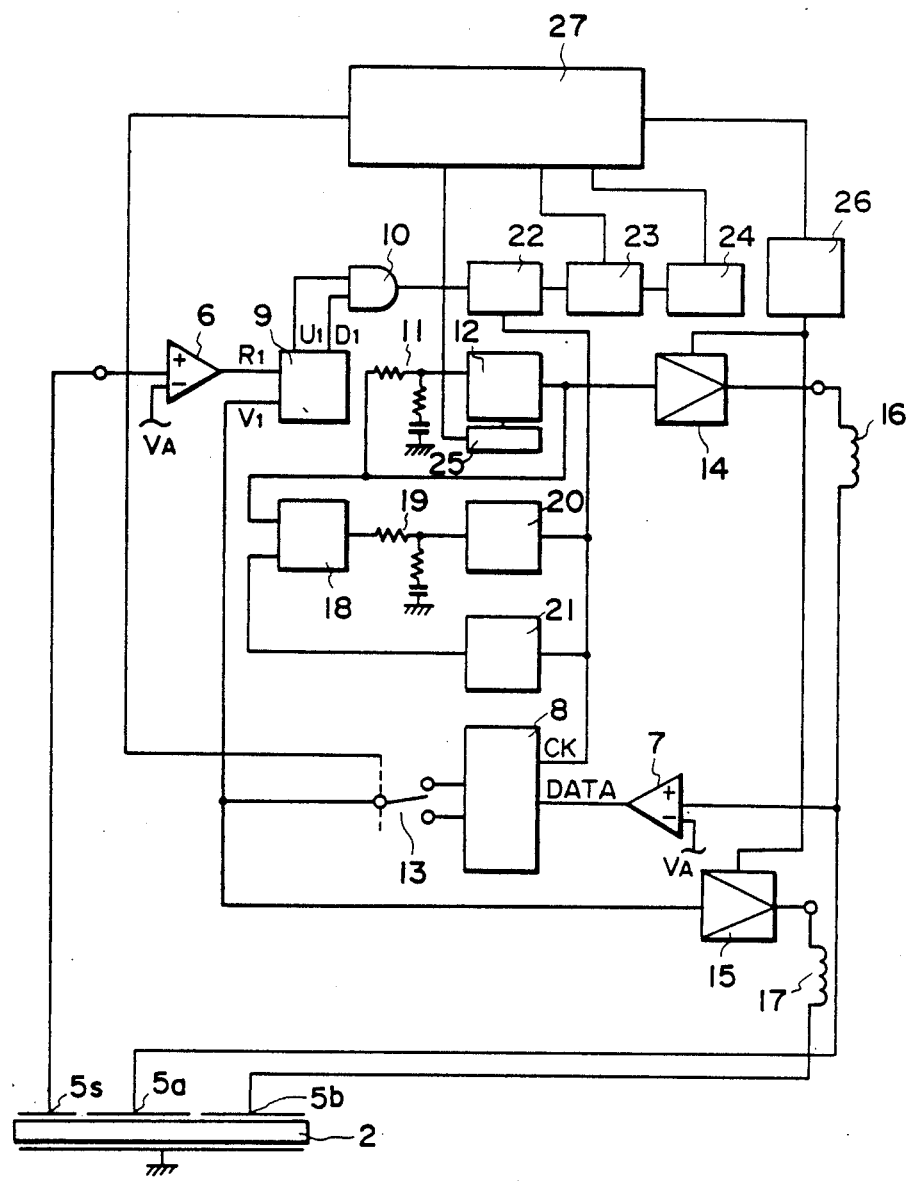
FIG. 4 shows an embodiment of the drive circuit of the vibration wave motor of the present invention.

FIG. 4 shows an embodiment of a drive circuit for the vibration wave motor of the present invention. Numeral 2 denotes a stator of the vibration wave motor of FIG. 1. Numeral 12 denotes a voltage controlled oscillator which oscillates at a frequency determined by an input voltage, numeral 14 denotes an amplifier and numeral 16 denotes a matching coil. A periodic signal from the oscillator 12 is applied to the electrodes 5a through the amplifier and the coil. Numeral 7 denotes a comparator which shapes a waveform applied from the amplifier 14 through the coil 16 (a voltage waveform applied to the stator of the vibration wave motor) to a pulse signal. Numeral 8 denotes a shift register which shifts the pulse from the comparator 7 by 90°. The pulse from the register 8 is applied to the electrodes 5b through a rotation direction switch 13, an amplifier 15 and a coil 17. In this arrangement, the periodic voltages having the phase differences of 90° are applied to the electrodes 5a and 5b. Numeral 18 denotes an edge-triggered phase comparator. The output of the oscillator 12 is applied to one input of the comparator 18 and an output of a 1/N frequency divider (1/32 frequency divider) 21 is applied to the other input. Numeral 20 denotes a voltage controlled oscillator which generates a frequency determined by the output of the comparator 18 supplied through a lag lead filter 19. The comparator 18 is open when the phase difference between the both input signals thereto is zero to maintain the output of the oscillator 20 as it is. When there is a phase difference between the input signals, the comparator 18 produces a signal having a duty determined by the direction and amount of the phase difference to increase or decrease the output frequency of the voltage controlled oscillator 20.

The phase difference between the output pulse of the oscillator 12 and the output pulse of the frequency divider 21 is detected, and when the phase of the output pulse of the frequency divider 21 retards with respect to the output pulse of the oscillator 12, that is, when the frequency of the output pulse of the frequency divider 21 decreases, the output of the comparator 18 is high for a period corresponding to the phase difference to increase the output frequency of the oscillator 20. When the phase of the output pulse of the frequency divider 21 advances with respect to the output pulse of the output pulse of the oscillator 12, that is, when the frequency of the output pulse of the frequency divider 21 increases, the output of the comparator 18 is low for a period corresponding to the phase difference to decrease the output frequency of the oscillator 20.

In this manner, the two inputs of the comparator 18 are controlled to be in phase so that the output of the frequency divider 21 is in phase with and of the some frequency as the output of the oscillator 12. Accordingly, the output frequency of the oscillator 20 is N (32) of the output frequency of the oscillator 12. Since it is used as a clock signal to the shift register 8, the output of (N/4)th stage of the register 8 is 90° phase-shifted with respect to the output of the oscillator 12. In this manner, the periodic signals having the 90° phase difference and supplied to the electrodes 5b and 5a. A specific configuration of the shift register 8 is shown in FIG. 5c.

Figure 5A:
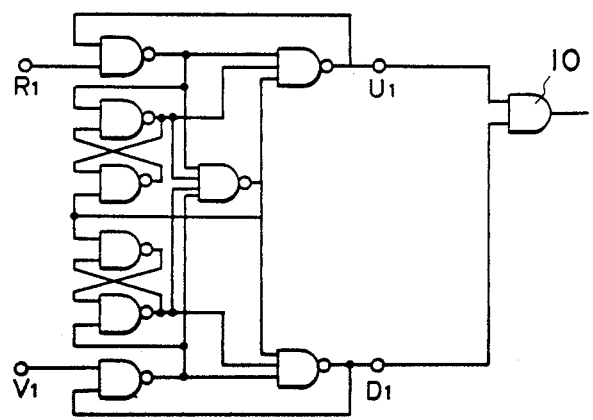
FIG. 5A shows a circuit diagram of a comparator 9 of FIG. 4.
Figure 5B:
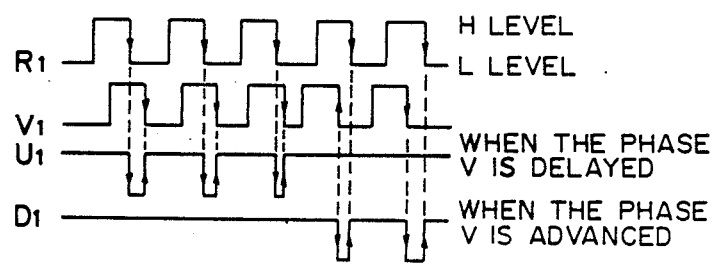
FIG. 5B shows an output wave form of the circuit of FIG. 5A.
Figure 5C:
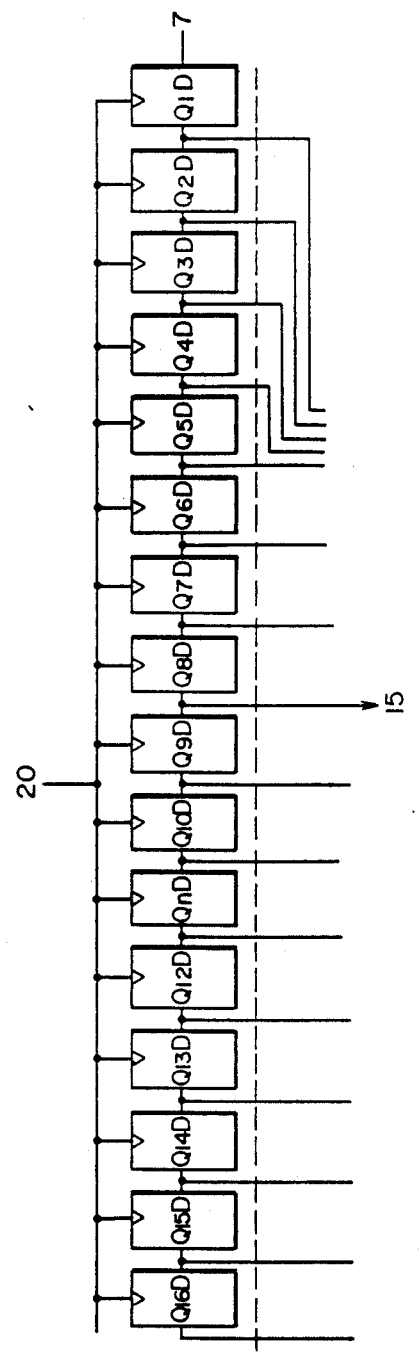
FIG. 5C shows a circuit diagram of a shift register 8 of FIG. 4.

Numeral 6 denotes a comparator for shaping the pulse from the electrode 5s to a pulse, and numeral 9 denotes an edge triggered phase comparator which is configured as shown in FIG. 5A. The comparator detects the phases of the pulses at the inputs $R_1$ and $V_1$. When the phase at the input $R_1$ is in advance of the phase at the input $V_1$ as shown in FIG. 5B, the output $V_1$ is low for a period corresponding to the phase difference, and when the phase of the input $R_1$ retards with respect to the phase of the input $V_1$, the output $D_1$ is low for a period corresponding to the phase difference. When the phases are same, both the outputs $V_1$ and $D_1$ are high.

Numeral 10 denotes an AND gate connected to the outputs $V_1$ and $D_1$ of the comparator 9, and numeral 22 denotes a counter having a reset terminal thereof connected to the AND gate 10. When the output of the AND gate 10 is high, the counter 22 is released from the reset state and counts the clock pulse of the oscillator 20. Numeral 24 denotes a numeric information setter, numeral 23 denotes a comparator for comparing the count of the counter 22 with the content of the numeric information setter to produce a high level output when the count is smaller than the content of the setter, numeral 25 denotes a free-running frequency setter of the voltage controlled oscillator, and numeral 27 denotes a microcomputer.

Figure 6:
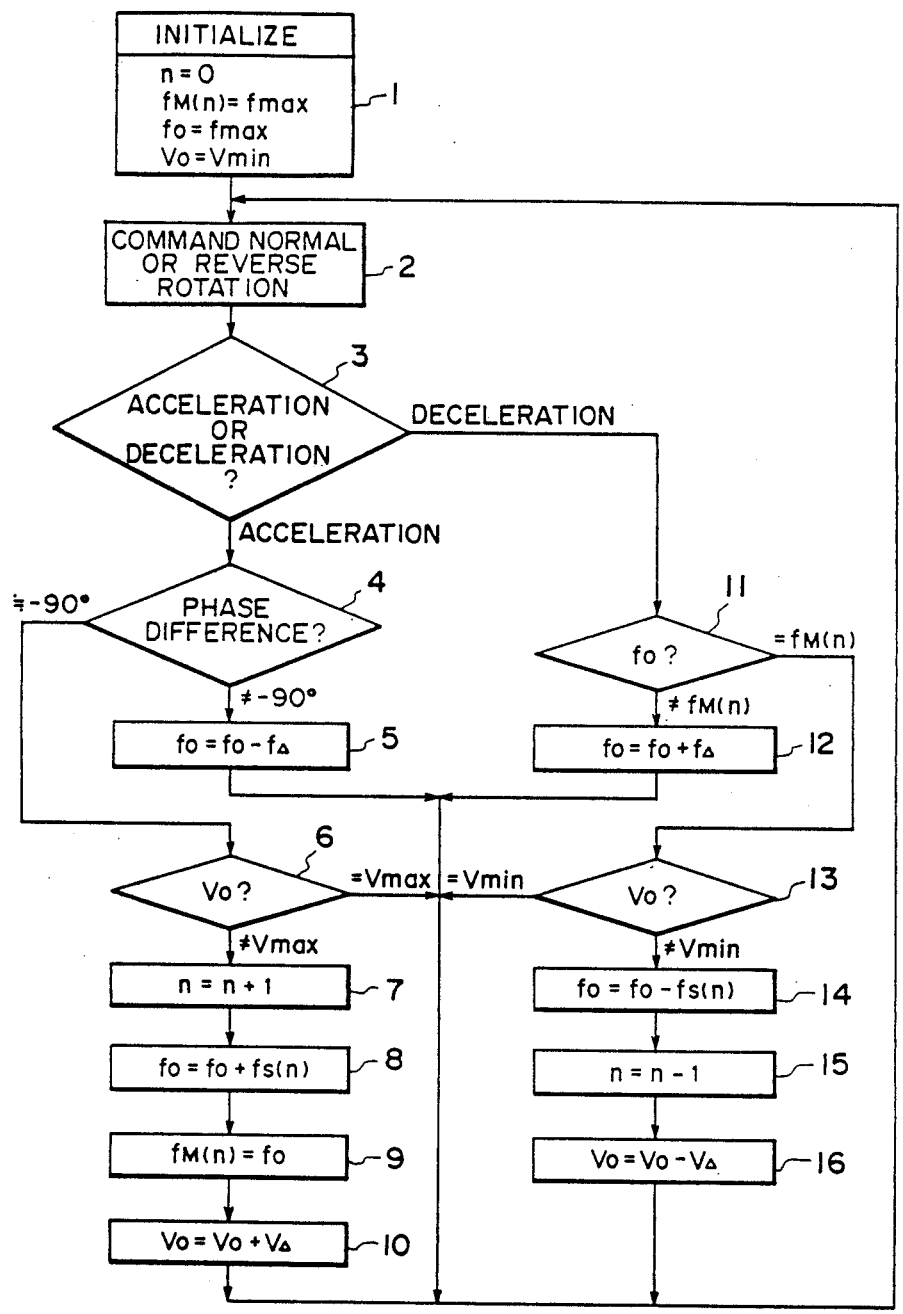
FIG. 6 illustrates a program contained in a computer of FIG. 4.

The operation of the embodiment of FIG. 4 is explained with reference to a program shown in FIG. 6. The program is contained in the computer 27.

When a power switch (not shown) is turned on, the program proceeds to a step 1 in which an initial free-running frequency $f_o$ is set into the free-running frequency setter 25. The free-running frequency $f_o$ is set to be sufficiently higher than a mechanical resonance frequency $f_r$ of the vibration wave motor and lower than $f_{rx}(n+1)^2 n^2$ (where n is the number of waves generated by the motor). The voltage controlled oscillator 12 oscillates at the set frequency $f_o$. The computer 27 sets a drive voltage Vmin and the voltage switch 26 selects Vmin as the drive voltage.

Under this condition, the clock signal which is N times as high as the output frequency $f_o$ of the oscillator 12 is supplied to the shift register 8 as a shift pulse. Therefore, the signal which is shifted by $\pm 90°$ ($\pm N/4$ stages) with respect to the output of the voltage controlled oscillator 12 is applied to the electrode 5b through the amplifier 15 and the coil 17, and the periodic voltages having the 90° phase difference are applied to the electrodes 5a and 5b. In a step 2, the switch 13 is actuated in accordance with forward/ backward rotation information which is set by a switch (not shown) to select $\pm 90°$.

Under this condition, since the periodic signals having the $\pm 90°$ phase difference are applied to the electrodes 5a and 5b, the motor rotates forward or backward. As the motor rotates, a signal is produced from the electrode 5s and it is shaped into a pulse by the comparator 6 and the pulse is applied to the input $R_1$ of the comparator 9.

At the initial stage of the motor drive, the frequency fo of the oscillator is higher than the resonance frequency and the motor rotates at a minimum rotation speed. The phase of the signal from the electrode 5s which is generated as the motor rotates and the phase of the drive signal of the electrodes 5a have 90° phase difference therebetween when the motor is driven at the resonance frequency, and the phase difference goes away from 90° as the drive frequency deviates from the resonance frequency. The signal $V_1$ derived from the periodic signal of the electrodes 5a by shifting it by the 90° shift register 8 and the signal $R_1$ from the electrode 5s are in phase at the resonance state, and the phase difference increases as the drive frequency deviates from the resonance frequency. The output $V_1$ or $D_1$ of the comparator 9 is low for a period corresponding to the phase difference, and the output of the AND gate 10 is also low for the period corresponding to the phase difference. At the initial stage, since the frequency $f_o$ of the drive signal is fairly away from the resonance frequency, the period of low output of the AND gate 10 is long and the count of the counter 22 is smaller than the setting. Thus, the comparator 23 produces a high level output.

The computer 27 detects the output of the comparator 23 in a step 4. When it detects the high level output of the comparator 23, the program proceeds to a step 5 where the setting frequency $f_o$ of the selfrunning frequency setter 25 is gradually decreased. That is, the frequency $f_o$ is changed to $f_o - f_\Delta$. The steps 4 and 5 are repeated so that the drive signal frequency of the electrodes 5a gradually approaches to the resonance frequency $f_{rL}$ under the drive voltage Vmin. On the other hand, as the drive frequency approaches to the resonance frequency $f_r$, the period of low level output of the AND gate 10 gradually decreases and the count of the counter 22 gradually increases.

By the repetition of the steps 2, 3, 4 and 5, the drive frequency of the electrodes 5a gradually decreases, and when it reaches the resonance frequency $f_{rL}$, the count of the counter 22 exceeds the setting. Thus, the comparator 23 produces a low level output and the computer 27 responds to the low level output to store the setting frequency of the self-running frequency setter 25. Then, the program proceeds to a step 6 where the status of the drive voltage is detected. Since the drive voltage $V_o$ has been set to Vmin at the initial stage, the program proceeds to a step 7 where n is changed to $n+1$, and then the program proceeds to a step 8.

In the step 8, the frequency $f_o$ is shifted by $f_s(n) = f_s(1)$ toward incremental direction with respect to the resonance frequency $f_{rL}$ under the low voltage Vmin ($f_o = f_o + f_s(n) = f_{rL} + f_s(1)$). The frequency $f_s(1)$ is a shift amount of frequency necessary to rotate the motor under the drive voltage Vmax at the same speed as that under the drive voltage Vmin at the resonance frequency $f_{rL}$.

In a step 9, $f_o = f_o + f_s(n) = f_{rL} + f_s(1)$ obtained in the step 8 is stored as $f_M(1)$. In a step 10, the drive voltage $V_o$ is incremented by $V_\Delta$ to set a new drive voltage $V_o = V_o + V_\Delta = Vmin + V_{\Delta = Vmax}$, which is outputted from the switch 26 as a drive voltage.

In the steps 1–10, the frequency gradually changes from $f_{max}$ under the drive voltage Vmin to the resonance frequency $f_{rL}$, the motor speed gradually increases from $MS_1$ to $MS_2$, and when the motor speed reaches $MS_2$, the drive voltage is switched to Vmax and the frequency is switched to $f_{rL} + f_s(1)$ so that the motor rotates at the speed $MS_2$.

Since the voltage is switched in the step 10 and the frequency is shifted in the step 9, the motor deviates from the resonance state after it has reached the maximum speed $MS_2$ under the drive voltage Vmin. As a result, the period of low level output of the AND gate 10 increases and the count of the counter 22 becomes smaller than the setting. Thus, the steps 4 and 5 are again repeated and the drive frequency gradually decreases from $f_M(1)$.

Since the drive voltage is now Vmax, the motor speed gradually increases from $MS_2$ as the frequency decreases. When the drive frequency reaches the resonance frequency $f_{rH}$ under the drive voltage Vmax in the repetition of the steps 4 and 5, the comparator 23 produces a low level output. When this is detected in the step 4, the program proceeds to the step 6. Since the drive voltage is now Vmax, the program proceeds to the step 2 from the step 6, and then repeats the steps 2, 4 and 6 so that the motor is driven at the frequency $f_{rH}$ under the drive voltage Vmax and the motor rotates at the maximum speed $MS_3$.

After the motor speed has reached $MS_2$, the frequency under the drive voltage Vmax changes between $f_M(1)$ and $f_{rH}$ and the motor speed changes from $MS_2$ to $MS_3$.

In the present invention, since the drive frequency of the motor is mainly between $f_{rL} + f_s(1)$ and $f_{rH}$, the motor speed can be changed over a wide range with a high drive efficiency.

In the course of speed control ($MS_1 - MS_3$) in the steps 1–10, if an operator manipulates a fixed command member (not shown), the computer 27 responds thereto and the program branches in the step 3. As a result, the steps 3 and 2 are repeated and the motor rotates at the drive voltage and the frequency when the fixed command member is activated. Accordingly, the motor maintains the current rotation and the operator can select any rotation speed.

The above operation is carried out when an acceleration command to the motor is detected in the step 3. (The acceleration command is issued by the computer 27 by the manipulation of an acceleration/ deceleration command member (not shown)). An operation when the deceleration command has been issued is explained.

The step 3 and then the step 11 are executed to check whether the drive frequency $f_o$ is equal to the stored frequency $f_M(1) = f_{rL} + f_s(1)$.

Assuming that the deceleration command has been issued while the motor was driven at the maximum speed $MS_3$, that is, under the drive voltage Vmax and the drive frequency $f_{rH}$, the frequency $f_{rH}$ is not equal to $f_M(1)$ Accordingly, the program proceeds to the step 12 where the drive frequency is incremented by $f\Delta$. Then, the steps 2, 3, 11 and 12 are repeated so that the drive frequency is gradually decreased until it reaches the stored frequency $f_M(1)$ and the motor speed is also gradually decreased from $MS_3$. When the drive frequency reaches $f_M(1)$, that is, when the motor speed reaches $MS_2$, the program proceeds to a step 13 where the drive voltage is detected. Since the drive voltage is now Vmax, the program proceeds to a step 14 from the step 12 where the drive frequency is shifted by $f_s(1)$ in a decrement direction. As a result, the drive frequency shifts to $f_M(1) - f_s(1) = f_{rL} + f_s(1) - f_s(1) = f_{rL}$. In a step 15, n is changed to $n - 1 = 0$. In a step 16, the drive voltage is decreased by $V\Delta$. That is, $Vmax - V\Delta = Vmin$ is supplied from the voltage switch 16 as a drive voltage.

The motor speed is thus reduced to $MS_2$ from $MS_3$ and then the drive voltage is switched to Vmin and the drive frequency is shifted to $f_{rL}$. The steps 2, 3 and 11 are then repeated. Since the frequency has been switched to $f_{rL}$ in the step 14, $f_M(1) \neq f_{rL}$ is detected in the step 11, and the program proceeds to the step 12. Accordingly, the motor speed is decreased to $MS_2$ and the steps 2, 3, 11 and 12 are repeated under the drive voltage Vmin so that the drive frequency gradually increases from $f_{rL}$ and the motor is thereafter gradually decelerated. In the course of the deceleration control, when the drive frequency reaches the stored frequency $f_M(1) = f_{rL} + f_s(1)$O, the program proceeds to the step 13 where the drive voltage is detected. Since the drive voltage is now Vmin, the steps 2, 3, 11 and 12 are repeated so that the motor is driven at the drive voltage Vmin and the drive frequency $f_{rL} + f_s(1)$ and the motor maintains the rotation at the current speed MSL.

In this manner, in the deceleration mode, the motor rotates between $MS_3$ and MSL. In the deceleration mode, since the motor rotates at the drive frequency and the voltage which were present when the operator manipulated the fixed command member, the motor speed can be selected between $MS_3$ and MSL.

In accordance with the present invention, the motor can be driven between the motor speeds MSL and $MS_3$ in the drive frequency range between $f_{rL} + f_s(1)$ and $f_{rH}$ which permits high efficiency drive.

In the present embodiment, the voltage is switched between two states, high and low, although it may be switched among multiple states such as three or four states.

We claim:

1. A control circuit for a vibration wave motor comprising:
   an electro-mechanical energy transducing element arranged on a vibration member;
   application means for applying periodic signals to said energy transducing element, said vibration member generating a driving force comprising a travelling vibration wave upon application of the periodic signals to said energy transducing element;
   a level adjuster for adjusting a level of the periodic signals;
   a frequency adjuster for adjusting a frequency of the periodic signals; and
   a switching circuit for switching the level of said level adjuster from a first level to a second level and for switching the frequency of said frequency adjuster from a first frequency to a second frequency when the frequency of said frequency adjuster has reached the first frequency during a period in which the level of said level adjuster is at the first level.

2. A control circuit for a vibration wave motor according to claim 1, wherein said frequency adjuster is frequency-variable at least between the first frequency and the second frequency, and in the course of frequency change from the second frequency to the first frequency for changing a motor speed, said frequency adjuster switches the frequency to the second frequency when the frequency reached the first frequency, and then changes the frequency from the second frequency to the first frequency.

3. A control circuit for a vibration wave motor according to claim 1 wherein, in a motor acceleration mode, said frequency adjuster gradually changes the frequency from a frequency near the second frequency to a frequency near the first frequency, and when the frequency reaches the first frequency, said switching circuit switches the frequency from the first frequency to the second frequency, and then the frequency is again changed from the second frequency to a frequency near the first frequency.

4. A control circuit for a vibration wave motor according to claim 1 wherein, in a motor deceleration mode, said frequency adjuster gradually changes the frequency from a frequency near the second frequency to a frequency near the first frequency, and when the frequency reaches the first frequency, said switching circuit switches the frequency from the first frequency to the second frequency, and then the frequency is again changed from the second frequency to a frequency near the first frequency.

5. A control circuit for a vibration wave motor according to claim 3 wherein the first frequency is at or near a resonance frequency when the periodic signal is at the first level.

6. A control circuit for a vibration wave motor according to claim 4 wherein the second frequency is at or near a resonance frequency when the periodic signal is at the second level.

7. A control circuit for a vibration wave motor according to claim 5 wherein said switching circuit detects a drive state of the motor and switches the frequency when the drive state of the motor is a resonance or near-resonance state.

8. A control circuit for a vibration wave motor according to claim 1 wherein said electromechanical energy transducing element is a piezoelectric element.

9. A control circuit for a vibration wave motor according to claim 1 wherein said electromechanical energy transducing element is an electrostrictive element.

10. A control circuit for a vibration wave motor comprising:
   an electro-mechanical energy transducing element arranged on a vibration member;

application means for applying periodic signals to said energy transducing element, said vibration member generating a driving force comprising a travelling vibration wave upon application of the periodic signals to said energy transducing element;

a frequency adjuster for adjusting a frequency of the periodic signals;

said frequency adjuster changing the frequency within a range between a first frequency and a second frequency when a motor speed is to be changed within a range between a first speed and a second speed and changing the frequency within a range between a third frequency shifted from the second frequency toward the first frequency, and a fourth frequency when the motor speed is to be changed within a range between the second speed and a third speed; and a level adjuster for adjusting a level of the periodic signals;

said level adjuster changing the level to a first level when the motor speed is to be changed within the range between the first speed and the second speed, and changing the level to a second level when the motor speed is to be changed within the range between the second speed and the third speed.

11. A control circuit for a vibration wave motor according to claim 10 wherein the third frequency is equal to the first frequency.

12. A control circuit for a vibration wave motor according to claim 11 wherein the first speed is lower than the second speed, the third speed is higher than the second speed, the first frequency is higher than the second and fourth frequencies, and the first level is lower than the second level.

13. A control circuit for a vibration wave motor according to claim 12 wherein the first frequency corresponds to the first speed, the second and third frequencies correspond to the second speed, and the fourth frequency corresponds to the third speed.

14. A control circuit for a vibration wave motor according to claim 10 wherein said electromechanical energy transducing element is a piezoelectric element.

15. A control circuit for a vibration wave motor according to claim 10 wherein said electromechanical energy transducing element is an electrostrictive element.

16. A control circuit for a vibration wave motor according to claim 10 wherein said frequency adjuster includes frequency change means for gradually changing the frequency toward a low frequency when a motor speed is to be increased, and shift means for shifting the frequency to a third frequency when the frequency has reached the second frequency, and after the frequency has been shifted to the third frequency by said shift means, said frequency change means gradually changes the frequency from the third frequency toward a low frequency.

17. A control circuit for a vibration wave motor comprising:
   (a) an electro-mechanical energy transducing element arranged on a vibration member;
   (b) application means for applying periodic signals to said energy transducing element,
   said vibration member generating a travelling vibration wave upon application of the periodic signals to said energy transducing element, to relatively drive a contact member contacted to said vibration member by the vibration wave;
   (c) a frequency information setting circuit;
   (d) a signal forming circuit for forming the periodic signals having the frequency determined by the frequency information set by said frequency information setting circuit;
   (e) update means for repeatedly updating the frequency information set by said frequency information setting circuit from a first frequency toward a second frequency to vary a motor speed;
   (f) shift means for shifting the frequency information set by said information setting circuit from the current setting toward the first frequency by a predetermined amount when the frequency of the periodic signals has reached the second frequency;
   the setting value of said information setting circuit being changed from the shifted setting value toward the second frequency by said update means after the shifted setting value has been set; and
   (g) a level switching circuit for switching a level of the periodic signals between a first level and a second level;
   said level switching circuit setting the periodic signals to the first level before the frequency is shifted by said shift means, and switching the level to the second level after the frequency has been shifted.

18. A control circuit for a vibration wave motor according to claim 17 wherein said shift means detects a drive state of the motor and shifts the frequency when the drive state is a resonance or near-resonance state, and the second frequency is equal to a frequency at the resonant or near-resonant state of the motor.

19. A control circuit for a vibration wave motor according to claim 18 wherein said electromechanical energy transducing element is a piezoelectric element.

20. A control circuit for a vibration wave motor according to claim 18 wherein said electromechanical energy transducing element is an electrostrictive element.

21. A control circuit for a vibration wave motor comprising:
   an electro-mechanical energy transducing element arranged on a vibration member;
   application means for applying periodic signals to said energy transducing element, said vibration member generating a driving force comprising a travelling vibration wave upon application of the periodic signals to said energy transducing element;
   a level adjuster for adjusting a level of the periodic signals;
   a frequency adjuster for adjusting a frequency of the periodic signals; and
   coordinating shifting means for shifting the level controlled by said level adjuster when the signal frequency adjusted by said frequency adjuster has become a predetermined value, and in coordination with the shifting of the signal level, for shifting the signal frequency adjusted by said frequency adjusters from said predetermined value.

22. A vibration wave motor device, comprising:
   an electro-mechanical energy transducing element arranged on a vibration member;
   an application means for applying periodic signals to said energy transducing element, said vibration member generating a driving force comprising a travelling vibration wave upon application of the periodic signals to said energy transducing element;

first adjusting means for adjusting the frequency of said periodic signals as a first factor;

second adjusting means for adjusting the level of said periodic signals as a second factor; and shifting means for shifting, when value of one of said two factors adjusted by one of said adjusting means shows a predetermined value, another value of said factors by another adjusting means and for shifting the value of the one of said factor from the predetermined value simultaneously.

23. A vibration wave motor device according to claim 22, wherein said electro-mechanical energy transducing element including first and second element parts to which said periodic signals having different phases are applied respectively.

24. A vibration wave motor device according to claim 23, wherein said electro-mechanical energy transducing element is piezoelectric element.

25. A vibration wave motor device according to claim 23, wherein said electro-mechanical energy transducing element is electrostrictive element.

26. A vibration wave motor device according to claim 21, wherein said electro-mechanical energy transducing element including first and second element parts to which said periodic signals have different phases are applied respectively.

27. A vibration wave motor device according to claim 26, wherein said electro-mechanical energy transducing element is piezoelectric element.

28. A vibration wave motor device according to claim 26, wherein said electro-mechanical energy transducing element is electrostrictive element.

* * * * *

UNITED STATES PATENT AND TRADEMARK OFFICE
CERTIFICATE OF CORRECTION

PATENT NO. : 4,954,741
DATED : September 4, 1990
INVENTOR(S) : ETSURO FURUTSU ET AL.  Page 1 of 2

It is certified that error appears in the above-identified patent and that said Letters Patent is hereby corrected as shown below:

AT [57] ABSTRACT

Line 10, "then" should read --thence--.

COLUMN 1

Line 5, "No. 7,346,281" should read --No. 346,281--.

COLUMN 4

Line 24, "some" should read --same--.
Line 32, "and" should read --are--.

COLUMN 5

Line 2, "$f_{rx}(n+1)^2n^2$" should read --$f_{rx}(n+1)^2/n^2$--.

COLUMN 7

Line 39, "$f_M(1)=f_{rL}+f_S(1)0,$" should read

--$f_M(1)=f_{rL}+f_S(1).$--.

COLUMN 8

Line 22, "reached" should read --reaches--.

COLUMN 10

Line 61, "ers" should read --er--.

UNITED STATES PATENT AND TRADEMARK OFFICE
CERTIFICATE OF CORRECTION

PATENT NO. : 4,954,741

DATED : September 4, 1990

INVENTOR(S) : ETSURO FURUTSU ET AL.    Page 2 of 2

It is certified that error appears in the above-identified patent and that said Letters Patent is hereby corrected as shown below:

COLUMN 11

Line 11, "factor" should read --factors--.
    Line 16, "including" should read --includes--.

COLUMN 12

Line 7, "vibration wave motor device" should read --control circuit for a vibration wave motor--.
    Line 9, "including" should read --includes--.
    Line 12, "vibration wave motor device" should read --control circuit for a vibration wave motor--.
    Line 15, "vibration wave motor device" should read --control circuit for a vibration wave motor--.

Signed and Sealed this

Thirty-first Day of March, 1992

Attest:

HARRY F. MANBECK, JR.

*Attesting Officer*    Commissioner of Patents and Trademarks